United States Patent
Shacham et al.

(10) Patent No.: US 9,891,945 B2
(45) Date of Patent: Feb. 13, 2018

(54) STORAGE RESOURCE MANAGEMENT IN VIRTUALIZED ENVIRONMENTS

(71) Applicant: QUALCOMM Incorporated, San Diego, CA (US)

(72) Inventors: Assaf Shacham, Zichron Yaakov (IL); Tom Yahalom, Maagan Michael (IL); David Teb, Acco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 15/075,945

(22) Filed: Mar. 21, 2016

(65) Prior Publication Data
US 2017/0269956 A1    Sep. 21, 2017

(51) Int. Cl.
G06F 9/46    (2006.01)
G06F 9/455   (2006.01)
G06F 3/06    (2006.01)

(52) U.S. Cl.
CPC ........ G06F 9/45558 (2013.01); G06F 3/0605 (2013.01); G06F 3/067 (2013.01);
(Continued)

(58) Field of Classification Search
CPC ............. G06F 11/3624; G06F 9/45558; G06F 3/0605; G06F 3/0613; G06F 3/0644; G06F 3/0659; G06F 3/0664; G06F 3/067; G06F 3/0679; G06F 2009/45583; G06F 2009/45595
See application file for complete search history.

(56) References Cited

U.S. PATENT DOCUMENTS 6,609,187 B1 * 8/2003 Merrell ................. G06F 3/0601
                                                 707/999.202
7,685,335 B2    3/2010 Arndt et al.
(Continued)

FOREIGN PATENT DOCUMENTS

WO    2012143944 A2    10/2012

OTHER PUBLICATIONS

International Search Report and Written Opinion for PCT/US2017/019357, dated May 31, 2017, 19 pages.
(Continued)

Primary Examiner — Camquy Truong
(74) Attorney, Agent, or Firm — Withrow & Terranova,PLLC

(57) ABSTRACT

Storage resource management in virtualized environments is provided. In this regard, when receiving a request for accessing a target general purpose partition (GPP) in a storage device, partition switching circuitry is configured to determine whether the target GPP equals a current GPP that is accessed by a list of existing requests. The partition switching circuitry adds the request into the list of existing requests if the target GPP equals the current GPP. Otherwise, the partition switching circuitry waits for the list of existing requests to be executed on the current GPP before switching to the target GPP to execute the request received from a client. By switching to the target GPP after executing the list of existing commands on the current GPP, it is possible to share a plurality of GPPs among multiple clients in a virtualized environment while maintaining data integrity and security in the storage device.

25 Claims, 6 Drawing Sheets

(52) U.S. Cl.
CPC .......... *G06F 3/0613* (2013.01); *G06F 3/0635* (2013.01); *G06F 3/0644* (2013.01); *G06F 3/0659* (2013.01); *G06F 3/0664* (2013.01); *G06F 3/0679* (2013.01); *G06F 3/062* (2013.01); *G06F 2009/45583* (2013.01); *G06F 2009/45595* (2013.01)

(56) References Cited

U.S. PATENT DOCUMENTS

| | | |
|---|---|---|
| 8,307,151 B1 | 11/2012 | Caraccio et al. |
| 2015/0199137 A1 | 7/2015 | Shin et al. |
| 2015/0234601 A1 | 8/2015 | Tsai et al. |
| 2015/0347016 A1 | 12/2015 | Shacham et al. |
| 2016/0054953 A1 | 2/2016 | Lee et al. |

OTHER PUBLICATIONS

Author Unknown, "Embedded Multi-Media Card (e•MMC) Electrical Standard (5.1)," JEDEC Solid State Technology Association, JEDEC Standard, JESD84-B51, Feb. 2015, 352 pages.

* cited by examiner

STORAGE RESOURCE MANAGEMENT IN VIRTUALIZED ENVIRONMENTS

BACKGROUND

I. Field of the Disclosure

The technology of the disclosure relates generally to an embedded multimedia card (eMMC) storage device.

II. Background

An embedded multimedia card (eMMC) is a non-volatile storage device commonly used in mobile computing devices, such as smart phones and tablet computers. The eMMC storage device is standardized by the Joint Electron Device Engineering Council (JEDEC), and supports multiple commands with command queuing features to enable multi-thread programming paradigms. In this manner, the eMMC storage device may provide improved random read/write access performance compared to conventional flash-based memory cards and embedded flash solutions, which process one command at a time.

Mobile computing devices are increasingly capable of supporting multiple virtual clients (e.g., hosts or other processor subsystems) operating simultaneously in virtualized environments. In such virtualized environments, an eMMC storage device may be organized logically into multiple general purpose partitions (GPPs). Accordingly, each virtual client may be assigned a GPP(s) among the multiple GPPs in the eMMC storage device. In this regard, the multiple virtual clients may each interact with a respective GPP(s) in the eMMC storage device as if the virtualized client were the only client communicating with the eMMC storage device. Similarly, the eMMC storage device may operate as if the eMMC storage device were communicating with only a single client at any given time, when, in fact, the eMMC storage device is communicating with multiple virtual clients. When the eMMC storage device is organized into multiple GPPs in a multi-client virtualized environment, communications among the multiple virtual clients and the multiple GPPs in the eMMC storage device may require additional processing to ensure data integrity and security.

SUMMARY OF THE DISCLOSURE

Aspects disclosed in the detailed description include storage resource management in virtualized environments. In this regard, partition switching circuitry is provided in a storage controller for switching between a plurality of general purpose partitions (GPPs) in a storage device. When the partition switching circuitry receives a request from a client for accessing a target GPP among the plurality of GPPs, the partition switching circuitry is configured to first determine whether the client is permitted to access the target GPP. The partition switching circuitry is further configured to determine whether the target GPP requested by the client equals a current GPP among the plurality of GPPs that is accessed by a list of existing requests. The partition switching circuitry adds the request received from the client into the list of existing requests if the target GPP equals the current GPP. Otherwise, the partition switching circuitry waits for the list of existing requests to be executed on the current GPP before switching to the target GPP to execute the request received from the client. By switching to the target GPP after executing the list of existing commands on the current GPP, it is possible to share the plurality of GPPs among multiple clients in a virtualized environment while maintaining data integrity and security in the storage device.

In this regard, in one aspect, a storage controller for controlling a storage device is provided. The storage controller comprises a base register interface (BRI) coupled to a virtual machine manager (VMM). The storage controller also comprises one or more client register interfaces (CRIs) configured to be coupled to one or more clients, respectively. The storage controller also comprises partition switching circuitry communicatively coupled to the BRI and the one or more CRIs. The partition switching circuitry is configured to receive a request from a client among the one or more clients via a CRI among the one or more CRIs for accessing a target GPP among a plurality of GPPs in the storage device. The partition switching circuitry is also configured to determine whether the client is permitted for accessing the target GPP. When the client is permitted for accessing the target GPP, the partition switching circuitry is further configured to determine whether the target GPP requested by the client equals a current GPP configured to be accessed by a list of existing requests. The partition switching circuitry is also configured to add the request received from the client to the list of existing requests when the target GPP equals the current GPP. If the target GPP is different from the current GPP, the partition switching circuitry is also configured to switch from the current GPP to the target GPP after the list of existing requests are executed on the current GPP, and execute the request received from the client on the target GPP.

In another aspect, a storage controller for controlling a storage device is provided. The storage controller comprises a BRI coupled to a means for managing virtual machine. The storage controller also comprises one or more CRIs configured to be coupled to one or more clients, respectively. The storage controller also comprises a means for switching partitions communicatively coupled to the BRI and the one or more CRIs. The means for switching partitions is configured to receive a request from a client among the one or more clients via a CRI among the one or more CRIs for accessing a target GPP among a plurality of GPPs in the storage device. The means for switching partitions is also configured to determine whether the client is permitted for accessing the target GPP. When the client is permitted for accessing the target GPP, the means for switching partitions is further configured to determine whether the target GPP requested by the client equals a current GPP configured to be accessed by a list of existing requests. The means for switching partitions is also configured to add the request received from the client to the list of existing requests when the target GPP equals the current GPP. If the target GPP is different from the current GPP, the means for switching partitions is also configured to switch from the current GPP to the target GPP after the list of existing requests are executed on the current GPP, and execute the request received from the client on the target GPP.

In another aspect, a method for switching GPPs in a storage controller is provided. The method comprises receiving a request from a client among one or more clients for accessing a target GPP among a plurality of GPPs in a storage device. The method also comprises determining whether the client is permitted for accessing the target GPP. The method also comprises, when the client is permitted for accessing the target GPP, determining whether the target GPP requested by the client equals a current GPP configured to be accessed by a list of existing requests. The method also comprises adding the request received from the client to the list of existing requests when the target GPP equals the current GPP. If the target GPP is different from the current GPP, the method also comprises switching from the current GPP to the target GPP after the list of existing requests are executed on the current GPP, and executing the request received from the client on the target GPP.

In another aspect, a virtualized storage system is provided. The virtualized storage system comprises a storage device comprising a plurality of GPPs. The virtualized storage system also comprises a storage controller for controlling the storage device. The storage controller comprises a base register interface (BRI) coupled to a virtual machine manager (VMM). The storage controller also comprises one or more client register interfaces (CRIs) configured to be coupled to one or more clients, respectively. The storage controller also comprises partition switching circuitry communicatively coupled to the BRI and the one or more CRIs. The partition switching circuitry is configured to receive a request from a client among the one or more clients via a CRI among the one or more CRIs for accessing a target GPP among the plurality of GPPs in the storage device. The partition switching circuitry is also configured to determine whether the client is permitted for accessing the target GPP. When the client is permitted for accessing the target GPP, the partition switching circuitry is further configured to determine whether the target GPP requested by the client equals a current GPP configured to be accessed by a list of existing requests. The partition switching circuitry is also configured to add the request received from the client to the list of existing requests when the target GPP equals the current GPP. If the target GPP is different from the current GPP, the partition switching circuitry is also configured to switch from the current GPP to the target GPP after the list of existing requests are executed on the current GPP, and execute the request received from the client on the target GPP.

DETAILED DESCRIPTION

Figure 1:
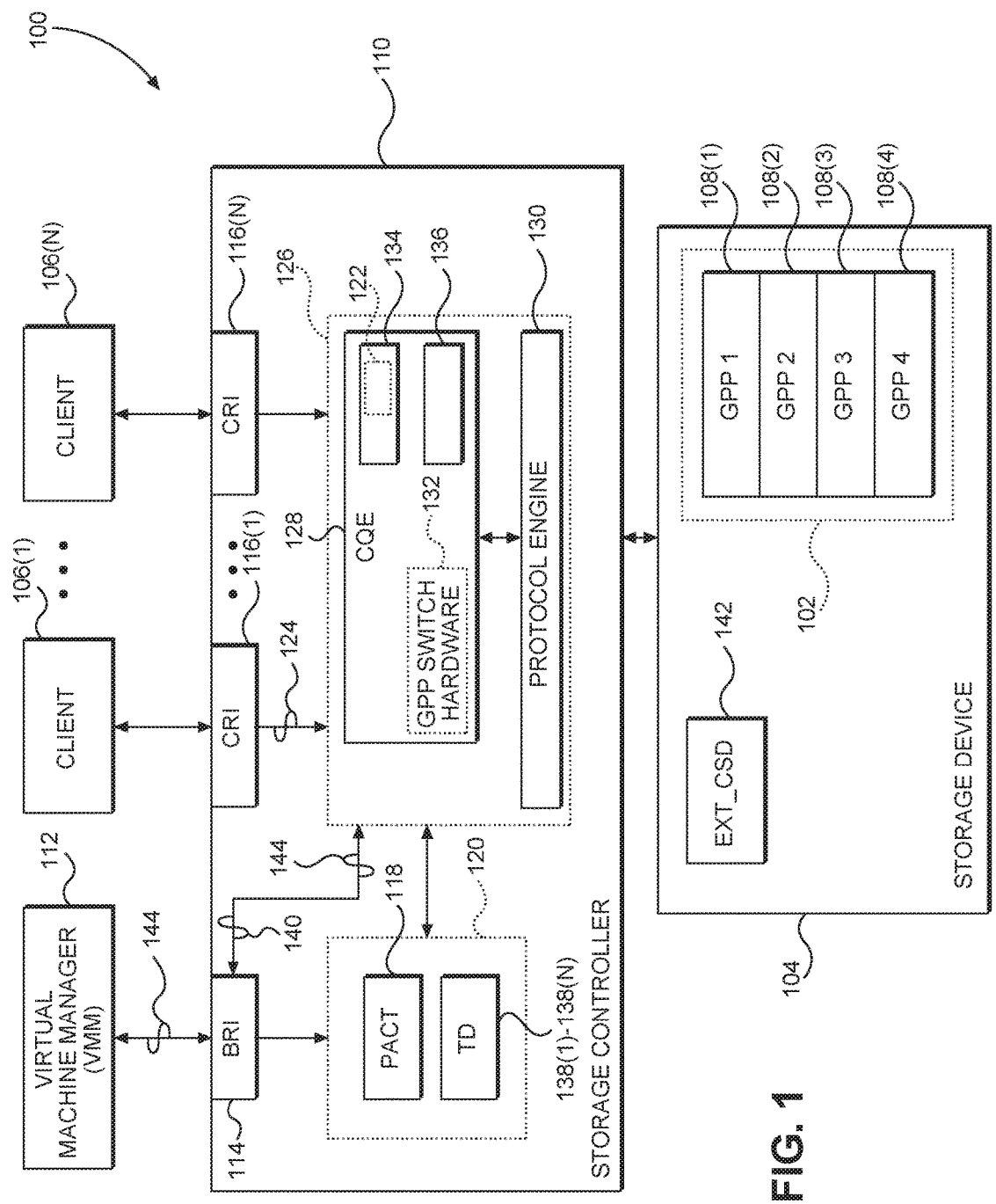
FIG. 1 is a schematic diagram of an exemplary virtualized storage system configured to share a storage medium in a storage device among one or more clients.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include storage resource management in virtualized environments. In this regard, partition switching circuitry is provided in a storage controller for switching between a plurality of general purpose partitions (GPPs) in a storage device. When the partition switching circuitry receives a request from a client for accessing a target GPP among the plurality of GPPs, the partition switching circuitry is configured to first determine whether the client is permitted to access the target GPP. The partition switching circuitry is further configured to determine whether the target GPP requested by the client equals a current GPP among the plurality of GPPs that is accessed by a list of existing requests. The partition switching circuitry adds the request received from the client into the list of existing requests if the target GPP equals the current GPP. Otherwise, the partition switching circuitry waits for the list of existing requests to be executed on the current GPP before switching to the target GPP to execute the request received from the client. By switching to the target GPP after executing the list of existing commands on the current GPP, it is possible to share the plurality of GPPs among multiple clients in a virtualized environment while maintaining data integrity and security in the storage device.

In this regard, FIG. 1 is a schematic diagram of an exemplary virtualized storage system 100 configured to share a storage medium 102 in a storage device 104 among one or more clients 106(1)-106(N). In a non-limiting example, the storage device 104 may be an embedded multimedia card (eMMC) storage device. The storage medium 102 may be logically organized into a plurality of GPPs 108(1)-108(4). In this regard, each of the plurality of GPPs 108(1)-108(4) represents the smallest storage medium unit for allocation among the one or more clients 106(1)-106(N). Although the storage medium 102 in FIG. 1 is shown to include only four GPPs 108(1)-108(4), it is possible for the storage medium 102 to include more or less than the four GPPs 108(1)-108(4).

With continuing reference to FIG. 1, the virtualized storage system 100 includes a storage controller 110 that is communicatively coupled to the storage device 104. The storage controller 110 is coupled to a virtual machine manager (VMM) 112 via a base register interface (BRI) 114. In a non-limiting example, the VMM 112 may be a Hypervisor and configured to provide a means for managing virtual machine. The storage controller 110 also includes one or more client register interfaces (CRIs) 116(1)-116(N) for coupling to the one or more clients 106(1)-106(N), respectively. In a non-limiting example, the BRI 114 and the one or more CRIs 116(1)-116(N) may be the same host controller interface (HCI), only labeled differently herein for the convenience of reference and discussion in the present disclosure.

To enable sharing of the storage medium 102 in the virtualized storage system 100, the VMM 112 is configured to allocate the plurality of GPPs 108(1)-108(4) to the one or more clients 106(1)-106(N). For the convenience of illustration, the client 106(1), the client 106(N), the GPP 108(1), and the GPP 108(2) are discussed hereinafter as non-limiting examples. It shall be appreciated that the configurations and operation principles discussed with references to the above non-limiting examples are applicable to all of the one or more clients 106(1)-106(N) and all of the plurality of GPPs 108(1)-108(4).

In a non-limiting example, the VMM 112 may assign the GPP 108(1) to the client 106(1) when the client 106(1) is initialized to perform a computing task (e.g., running an application). Likewise, the VMM 112 may also assign the GPP 108(2) to the client 106(N) when the client 106(N) is initialized for another computing task. The VMM 112 may store GPP allocations for the client 106(1) and the client 106(N) as task descriptors (TDs) (not shown) in a system memory (not shown). In addition, the VMM 112 may also store the GPP allocations of the client 106(1) and the client 106(N) in a partition access control table (PACT) 118 via the BRI 114. As is further discussed later, the PACT 118 may be used to validate permissions for the client 106(1) and the client 106(N) to access the GPP 108(1) and the GPP 108(2), respectively. The PACT 118 may be provided in a cache 120 in the storage controller 110.

In the virtualized storage system 100, only one of the plurality of GPPs 108(1)-108(4) may be accessed by any of the one or more clients 106(1)-106(N) at a given time. As such, the storage controller 110 may configure one of the plurality of GPPs 108(1)-108(4) as a current GPP 122. For example, the storage controller 110 may configure the GPP 108(2) as the current GPP 122 to allow only the client 106(N) to access the storage medium 102. In this regard, when the client 106(1) requests to access the storage medium 102 via a request 124, the storage controller 110 may already have a list of existing requests (not shown) from the client 106(N) waiting to access the current GPP 122. If the storage controller 110 immediately reconfigures the GPP 108(1), which is allocated to the client 106(1) by the VMM 112, as the current GPP 122, the list of existing requests from the client 106(N) may have to be preempted, thus causing unintended consequences (e.g., data loss or corruption) on the client 106(N). Hence, it may be desired to provide an intelligent GPP switching mechanism in the virtualized storage system 100 to ensure data integrity and security among the one or more clients 106(1)-106(N).

In this regard, partition switching circuitry 126 is provided in the storage controller 110 to enable intelligent GPP switching in the virtualized storage system 100. In a non-limiting example, the partition switching circuitry 126 may be configured to provide a means for switching partitions. The partition switching circuitry 126 is communicatively coupled to the BRI 114 and the one or more CRIs 116(1)-116(N). The partition switching circuitry 126 includes a command queue engine (CQE) 128 and a protocol engine 130. In a non-limiting example, both the CQE 128 and the protocol engine 130 may be hardware elements having software capabilities. The CQE 128 further includes GPP switch hardware 132, a GPP configuration register 134, and a first-in first-out (FIFO) command queue 136. The GPP configuration register 134 is configured to store the current GPP 122, as is further discussed below in FIG. 2.

Figure 2:
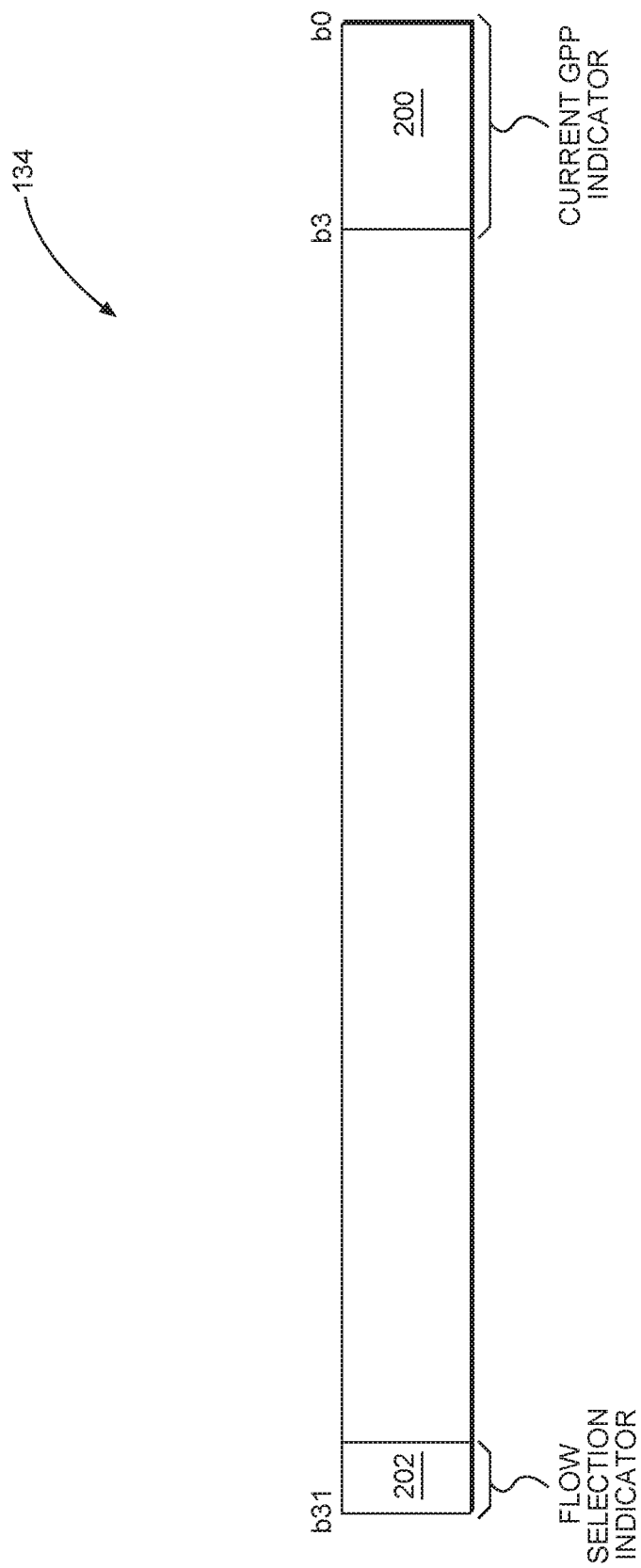
FIG. 2 is a schematic diagram providing an exemplary illustration of a general purpose partition (GPP) configuration register that may be configured to indicate a current GPP among a plurality of GPPs in the storage device of FIG. 1.

In this regard, FIG. 2 is a schematic diagram providing an exemplary illustration of the GPP configuration register 134 of FIG. 1. In a non-limiting example, the GPP configuration register 134 is able to store thirty-two binary bits labeled from bit zero (b0) through bit thirty-one (b31). The GPP configuration register 134 includes a current GPP indicator 200 and a flow selection indicator 202. In an exemplary aspect, the current GPP indicator 200 occupies b0 through bit three (b3) and is configured to store the current GPP 122. The flow selection indicator 202 is stored in b31 of the GPP configuration register 134. When set to zero (0), the flow selection indicator 202 indicates that the storage device 104 is an eMMC revision 5.1 (eMMC 5.1) storage device, and the partition switching circuitry 126 utilizes a legacy partition switching process to switch between the plurality of GPPs 108(1)-108(4). When set to one (1), the flow selection indicator 202 indicates that the storage device 104 is an eMMC revision 5.2 plus (eMMC 5.2+) storage device, and the partition switching circuitry 126 utilizes an optimized partition switching process to switch between the plurality of GPPs 108(1)-108(4).

With reference back to FIG. 1, the FIFO command queue 136 contains eMMC command(s) (e.g., data read/write command, partition switching command, etc.) to be executed sequentially by the storage controller 110. In this regard, the FIFO command queue 136 may contain the list of existing requests to be executed on the current GPP 122 when the partition switching circuitry 126 receives the request 124 from the client 106(1). To ensure that the list of existing requests in the FIFO command queue 136 is not preempted, the partition switching circuitry 126 is configured to first determine which of the plurality of GPPs 108(1)-108(4) the VMM 112 has assigned to the client 106(1).

According to the discussion above, the VMM 112 allocates the GPP 108(1) to the client 106(1) when the client 106(1) is initialized. In this regard, the GPP 108(1) is also a target GPP 108(1) the client 106(1) intends to access in the request 124. Further, according to previous discussions, the VMM 112 may have stored the GPP allocations for the one or more clients 106(1)-106(N) as TD(s) in the system memory. As such, the partition switching circuitry 126 may retrieve the TD(s) from the system memory and store the retrieved TD(s) in one or more TD registers 138(1)-138(N). The one or more TD registers 138(1)-138(N) may be provided in the cache 120 in the storage controller 110 and correspond to the one or more clients 106(1)-106(N). In this regard, in a non-limiting example, the partition switching circuitry 126 may retrieve the GPP allocation for the client 106(1) from the system memory and store the GPP allocation in the TD register 138(1). To further illustrate formats of the one or more TD registers 138(1)-138(N), FIG. 3 is discussed next.

Figure 3:
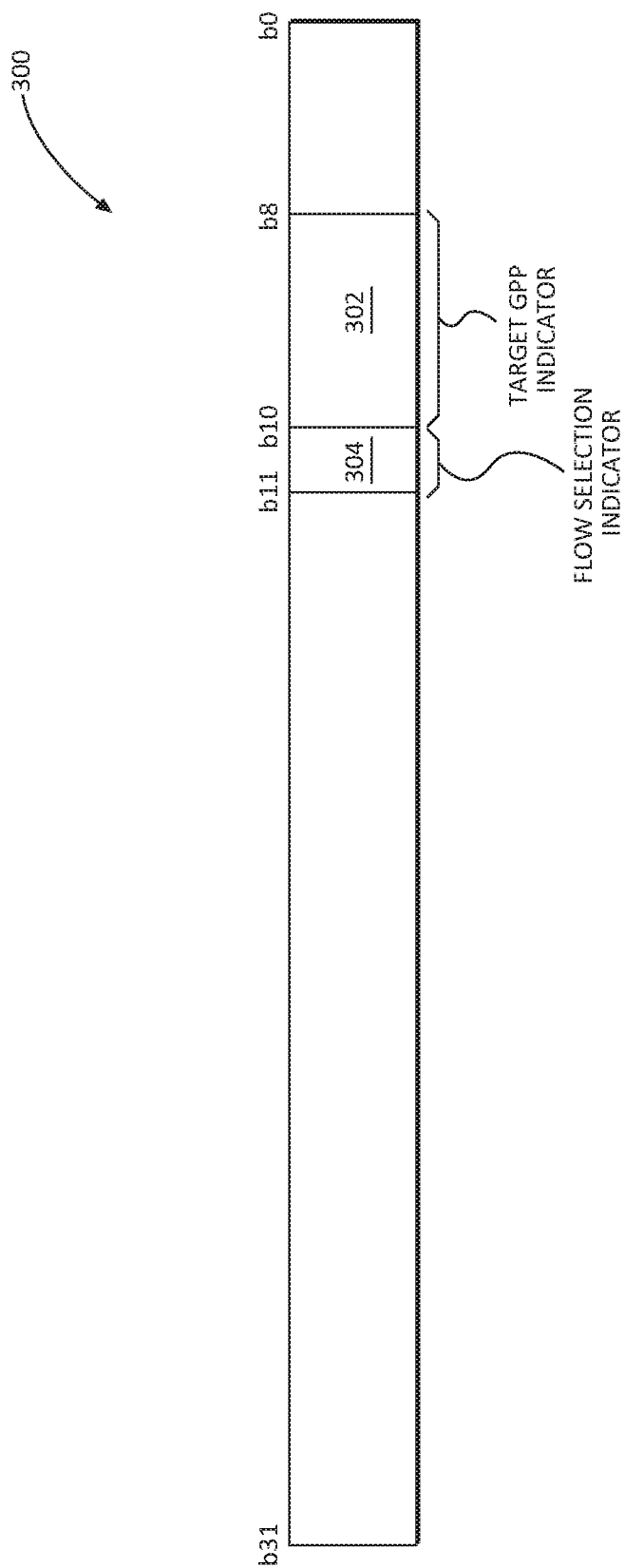
FIG. 3 is a schematic diagram of an exemplary task descriptor (TD) register configured to store respective target GPPs of the one or more clients of FIG. 1.

In this regard, FIG. 3 is a schematic diagram of an exemplary TD register 300 that may be configured to store respective target GPPs of the one or more clients 106(1)-106(N) of FIG. 1. The TD register 300, which may be any of the one or more TD registers 138(1)-138(N) of FIG. 1, is able to store thirty-two binary bits labeled from b0 through b31. The TD register 300 includes a target GPP indicator 302 and a flow selection indicator 304. In an exemplary aspect, the target GPP indicator 302 occupies bit eight (b8) through bit ten (b10) and is configured to store a respective target GPP of a corresponding client. For example, in the TD register 138(1), the target GPP indicator 302 indicates the target GPP 108(1) that the VMM 112 assigns to the client 106(1).

The flow selection indicator 304 may be stored in bit eleven (b11) of the TD register 300. When set to 0, the flow selection indicator 304 indicates that the storage device 104 is the eMMC 5.1 storage device, and the partition switching circuitry 126 utilizes the legacy partition switching process to switch to the respective target GPP indicated by the target GPP indicator 302. When set to 1, the flow selection indicator 304 indicates that the storage device 104 is the eMMC 5.2+ storage device, and the partition switching circuitry 126 utilizes the optimized partition switching process to switch to the respective target GPP indicated by the target GPP indicator 302.

With reference back to FIG. 1, after determining the target GPP 108(1) for the client 106(1) according to the TD register 138(1), the partition switching circuitry 126 may be further configured to determine whether the client 106(1) is indeed permitted to access the target GPP 108(1) based on the PACT 118. The partition switching circuitry 126 may be configured to return an access control violation notification 140 to the client 106(1) via the CRI 116(1) if the partition switching circuitry 126 determines that the client 106(1) is not permitted to access the target GPP 108(1). In addition, the partition switching circuitry 126 is able to determine whether the storage device 104 is the eMMC 5.1 storage device or the eMMC 5.2+ storage device based on the flow selection indicator 304 (not shown) in the TD register 138(1).

If the storage device 104 is determined to be the eMMC 5.1 storage device, the partition switching circuitry 126 then adopts the legacy partition switching process to switch from the current GPP 122 to the target GPP 108(1) requested by the client 106(1). According to the legacy partition switching process, the CQE 128 first compares the target GPP 108(1) against the current GPP 122 to determine whether the target GPP 108(1) equals the current GPP 122. If the target GPP 108(1) equals the current GPP 122, the CQE 128 simply adds the request 124 to the end of the FIFO command queue 136. When the target GPP 108(1) differs from the current GPP 122, it may be an indication that the FIFO command queue 136 contains the list of existing requests waiting to be executed on the current GPP 122. In this regard, to avoid preempting the list of existing requests in the FIFO command queue 136, the CQE 128 is configured to wait for the list of existing requests in the FIFO command queue 136 to be executed before switching to the target GPP 108(1). Subsequently, the CQE 128 may then execute the request 124 on the target GPP 108(1) by adding the request 124 into the FIFO command queue 136.

In a non-limiting example, the request 124 provided by the client 106(1) may be an eMMC CMD44 command for reading data from the target GPP 108(1) or an eMMC CMD45 command for writing data to the target GPP 108(1). Accordingly, when the CQE 128 determines that the target GPP 108(1) differs from the current GPP 122, the CQE 128 first adds an eMMC queue barrier (QBR) command into the FIFO command queue 136 to ensure that the list of existing requests in the FIFO command queue 136 are not preempted. The CQE 128 may then add an eMMC CMD6 command to the FIFO command queue 136 to switch from the current GPP 122 to the target GPP 108(1). In this regard, the eMMC CMD6 is a GPP switching command The CQE 128 may either provide the eMMC CMD6 command directly to the storage device 104 or via the GPP switch hardware 132. The eMMC CMD6 command causes an extended (EXT) card specific data (CSD) (EXT_CSD) register 142 in the storage device 104 to switch to the target GPP 108(1). The VMM 112 may trap the eMMC CMD6 command and update the current GPP indicator 200 of FIG. 2 in the GPP configuration register 134 to the target GPP 108(1). As such, the current GPP 122 is updated to the GPP 108(1). Subsequently, the CQE 128 may add the eMMC CMD44 and/or the eMMC CMD45 into the FIFO command queue 136 for execution on the target GPP 108(1).

With continuing reference to FIG. 1, as previously discussed, the VMM 112 allocates the target GPP 108(1) to the client 106(1) when the client 106(1) is initialized. In some cases, the client 106(1) may be a time-critical task having a higher execution priority than the rest of the one or more clients 106(1)-106(N). As such, the VMM 112 may force the partition switching circuitry 126 to switch to the target GPP 108(1) immediately. In this regard, the VMM 112 may provide a GPP switch command 144 to the partition switching circuitry 126 via the BRI 114. The protocol engine 130 in the partition switching circuitry 126 is configured to switch to the target GPP 108(1) immediately upon receiving the GPP switch command 144.

Figure 4:
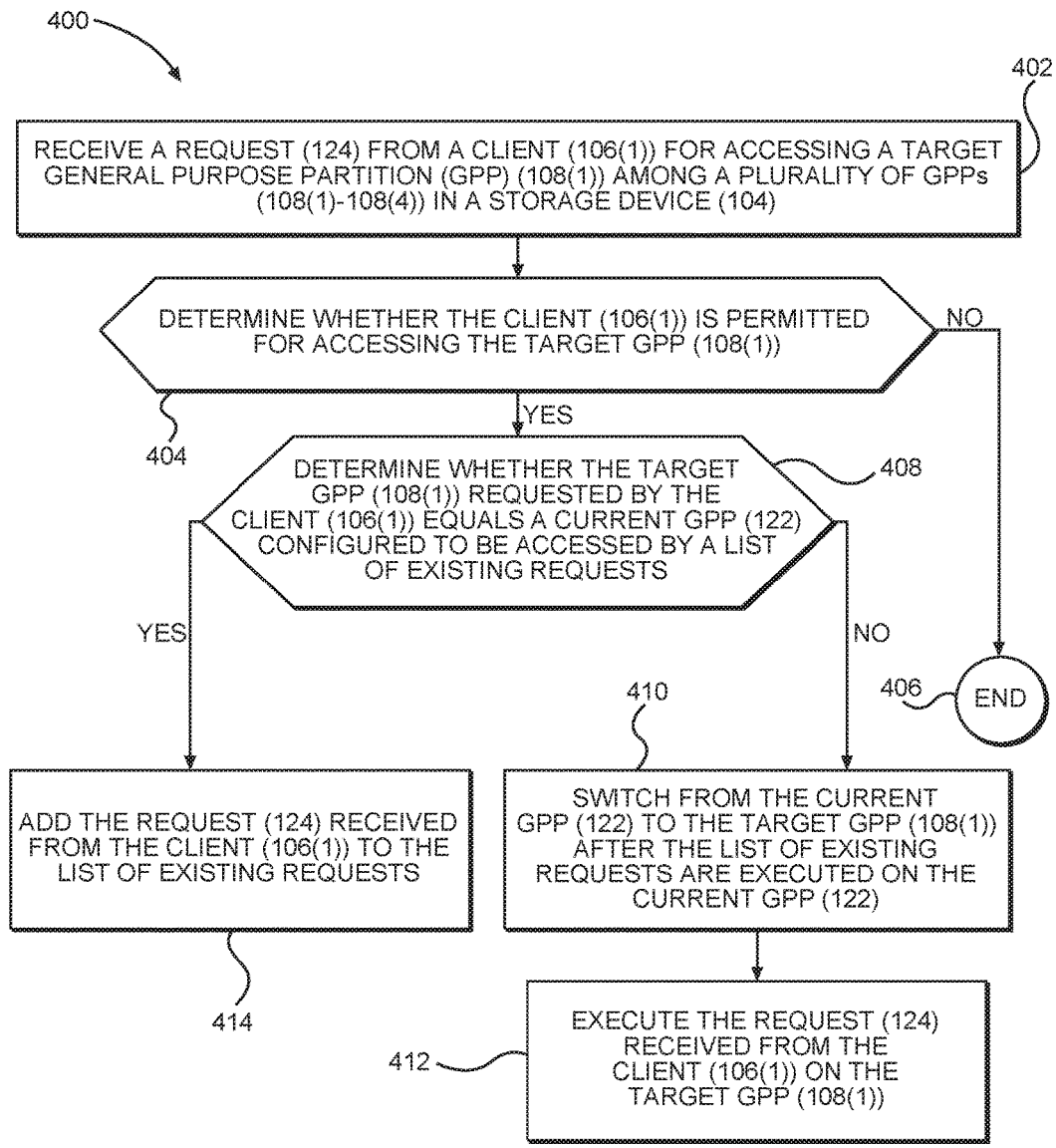
FIG. 4 is a flowchart of an exemplary legacy partition switching process that may be performed when the storage device of FIG. 1 is determined to be an embedded multimedia card (eMMC) revision 5.1 (eMMC 5.1) storage device.

FIG. 4 is a flowchart of an exemplary legacy partition switching process 400 that may be performed by the partition switching circuitry 126 of FIG. 1 when the storage device 104 is determined to be an eMMC 5.1 storage device. With reference to FIG. 4, the partition switching circuitry 126 receives the request 124 from the client 106(1) for accessing the target GPP 108(1) among the plurality of GPPs 108(1)-108(4) in the storage device 104 (block 402). The CQE 128 in the partition switching circuitry 126 determines whether the client 106(1) is permitted to access the target GPP 108(1) (block 404). When the CQE 128 determines that the client 106(1) is not permitted to access the target GPP 108(1), the legacy partition switching process 400 is terminated (block 406). When the CQE 128 determines that the client 106(1) is permitted to access the target GPP 108(1), the CQE 128 further determines whether the target GPP 108(1) requested by the client 106(1) equals the current GPP 122 configured to be accessed by the list of existing tasks (block 408). If the target GPP 108(1) differs from the current GPP 122, the CQE 128 switches from the current GPP 122 to the target GPP 108(1) after the list of existing tasks are executed on the current GPP 122 (block 410). Subsequently, the CQE 128 executes the request 124 received from the client 106(1) on the target GPP 108(1) (block 412). If the target GPP 108(1) is the same as the current GPP 122, the CQE 128 adds the request 124 received from the client 106(1) to the list of existing requests (block 414).

Figure 5:
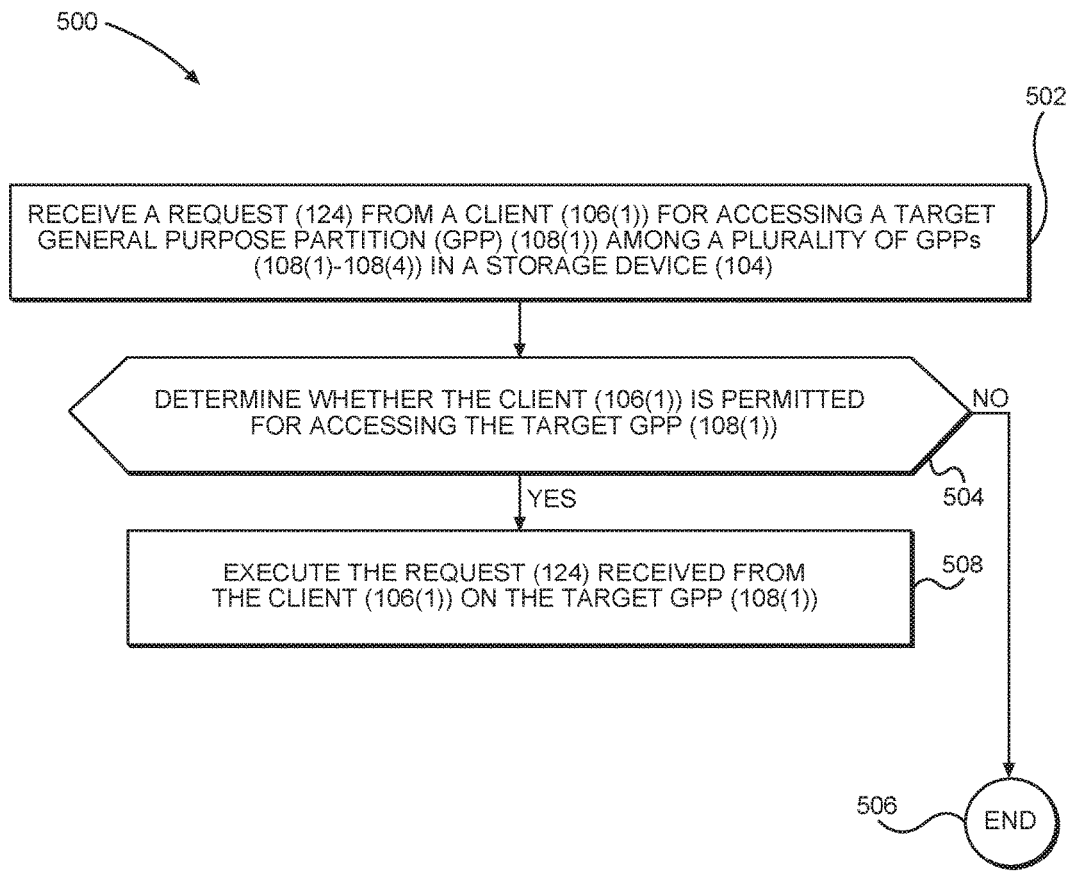
FIG. 5 is a flowchart of an exemplary optimized partition switching process that may be performed when the storage device of FIG. 1 is determined to be an eMMC revision 5.2 plus (eMMC 5.2+) storage device.

With reference back to FIG. 1, if the storage device 104 is determined to be the eMMC 5.2+ storage device, the partition switching circuitry 126 then adopts the optimized partition switching process to switch from the current GPP 122 to the target GPP 108(1) requested by the client 106(1). In this regard, FIG. 5 is a flowchart of an exemplary optimized partition switching process 500 that may be performed by the partition switching circuitry 126 of FIG. 1 when the storage device 104 is determined to be an eMMC 5.2+ storage device. With reference to FIG. 5, the partition switching circuitry 126 receives the request 124 from the client 106(1) for accessing the target GPP 108(1) among the plurality of GPPs 108(1)-108(4) in the storage device 104 (block 502). The CQE 128 in the partition switching circuitry 126 determines whether the client 106(1) is permitted to access the target GPP 108(1) (block 504). When the CQE 128 determines that the client 106(1) is not permitted to access the target GPP 108(1), the optimized partition switching process 500 is terminated (block 506). When the CQE 128 determines that the client 106(1) is permitted to access the target GPP 108(1), the CQE 128 executes the request 124 received from the client 106(1) on the target GPP 108(1) (block 508).

Storage resource management in virtualized environments according to aspects disclosed herein may be provided in or integrated into any processor-based device, such as the storage controller 110 of FIG. 1. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 6:
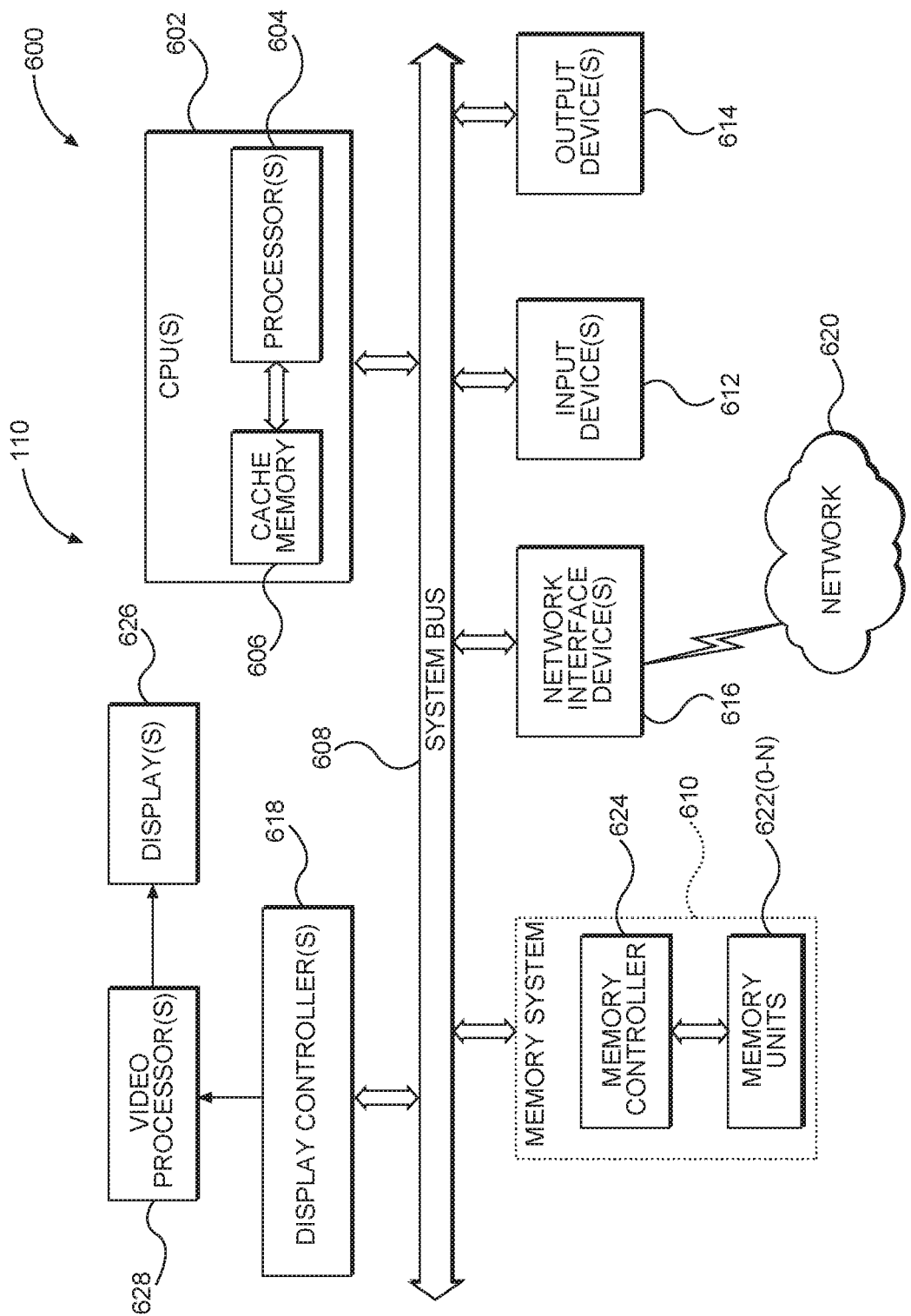
FIG. 6 is a block diagram of an exemplary processor-based system that can include the virtualized storage system in FIG. 1 configured to share the storage medium among the one or more clients.

In this regard, FIG. 6 illustrates an example of a processor-based system 600 that can support the storage controller 110 of FIG. 1. In this example, the processor-based system 600 includes one or more central processing units (CPUs) 602, each including one or more processors 604. The CPU(s) 602 may have cache memory 606 coupled to the processor(s) 604 for rapid access to temporarily stored data. The CPU(s) 602 is coupled to a system bus 608. As is well known, the CPU(s) 602 communicates with other devices by exchanging address, control, and data information over the system bus 608. Although not illustrated in FIG. 6, multiple system buses 608 could be provided, wherein each system bus 608 constitutes a different fabric.

Other master and slave devices can be connected to the system bus 608. As illustrated in FIG. 6, these devices can include a memory system 610, one or more input devices 612, one or more output devices 614, one or more network interface devices 616, and one or more display controllers 618, as examples. The input device(s) 612 can include any type of input device, including, but not limited to, input keys, switches, voice processors, etc. The output device(s) 614 can include any type of output device, including, but not limited to, audio, video, other visual indicators, etc. The network interface device(s) 616 can be any device configured to allow exchange of data to and from a network 620. The network 620 can be any type of network, including, but not limited to, a wired or wireless network, a private or public network, a local area network (LAN), a wireless local area network (WLAN), a wide area network (WAN), a BLUETOOTH™ network, or the Internet. The network interface device(s) 616 can be configured to support any type of communications protocol desired. The memory system 610 can include one or more memory units 622(0-N) and a memory controller 624.

The CPU(s) 602 may also be configured to access the display controller(s) 618 over the system bus 608 to control information sent to one or more displays 626. The display controller(s) 618 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To illustrate clearly this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A storage controller for controlling a storage device, comprising:
a base register interface (BRI) coupled to a virtual machine manager (VMM);

one or more client register interfaces (CRIs) configured to be coupled to one or more clients, respectively; and partition switching circuitry communicatively coupled to the BRI and the one or more CRIs, the partition switching circuitry configured to:

receive a request from a client among the one or more clients via a CRI among the one or more CRIs for accessing a target general purpose partition (GPP) among a plurality of GPPs in the storage device;

determine whether the client is permitted for accessing the target GPP; and when the client is permitted for accessing the target GPP:

determine whether the target GPP requested by the client equals a current GPP configured to be accessed by a list of existing requests;

add the request received from the client to the list of existing requests when the target GPP equals the current GPP; and if the target GPP is different from the current GPP:

switch from the current GPP to the target GPP after the list of existing requests are executed on the current GPP; and execute the request received from the client on the target GPP.

2. The storage controller of claim 1, wherein the partition switching circuitry is configured to switch from the current GPP to the target GPP immediately upon receiving a GPP switch command from the VMM via the BRI.

3. The storage controller of claim 2, wherein the partition switching circuitry comprises a protocol engine configured to switch from the current GPP to the target GPP immediately upon receiving the GPP switch command.

4. The storage controller of claim 1 further comprising a partition access control table (PACT), wherein the partition switching circuitry is configured to determine whether the client is permitted for accessing the target GPP based on the PACT.

5. The storage controller of claim 4, wherein the partition switching circuitry is further configured to return an access control violation notification to the client via the CRI if the partition switching circuitry determines that the client is not permitted to access the target GPP.

6. The storage controller of claim 1, wherein the storage device is comprised of an embedded multimedia card (eMMC) revision 5.1 (eMMC 5.1) storage device.

7. The storage controller of claim 6, wherein the request received from the client is comprised of an eMMC CMD44 command or an eMMC CMD45 command.

8. The storage controller of claim 7, wherein the partition switching circuitry comprises a command queue engine (CQE) configured to:

determine whether the target GPP requested by the client equals the current GPP among the plurality of GPPs accessed by the storage controller;

if the target GPP equals the current GPP:

add the eMMC CMD44 command or the eMMC CMD45 command into a first-in first-out (FIFO) command queue; and if the target GPP is different from the current GPP:

add an eMMC queue barrier (QBR) command into the FIFO command queue;

add an eMMC CMD6 command into the FIFO command queue; and add the eMMC CMD44 command or the eMMC CMD45 command into the FIFO command queue.

9. The storage controller of claim 1, wherein the partition switching circuitry is configured to execute the request received from the client on the target GPP when the client is permitted for accessing the target GPP and the storage device is determined to be an eMMC revision 5.2 plus (eMMC 5.2+) storage device.

10. The storage controller of claim 1, wherein the VMM is comprised of a Hypervisor.

11. The storage controller of claim 1 provided in a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

12. A storage controller for controlling a storage device, comprising:

a base register interface (BRI) coupled to a means for managing virtual machine;

one or more client register interfaces (CRIs) configured to be coupled to one or more clients, respectively; and a means for switching partitions communicatively coupled to the BRI and the one or more CRIs, the means for switching partitions configured to:

receive a request from a client among the one or more clients via a CRI among the one or more CRIs for accessing a target general purpose partition (GPP) among a plurality of GPPs in the storage device;

determine whether the client is permitted for accessing the target GPP; and when the client is permitted for accessing the target GPP:

determine whether the target GPP requested by the client equals a current GPP configured to be accessed by a list of existing requests;

add the request received from the client to the list of existing requests when the target GPP equals the current GPP; and if the target GPP is different from the current GPP:

switch from the current GPP to the target GPP after the list of existing requests are executed on the current GPP; and execute the request received from the client on the target GPP.

13. A method for switching general purpose partitions (GPPs) in a storage controller, comprising:

receiving a request from a client among one or more clients for accessing a target GPP among a plurality of GPPs in a storage device;

determining whether the client is permitted for accessing the target GPP; and when the client is permitted for accessing the target GPP:

determining whether the target GPP requested by the client equals a current GPP configured to be accessed by a list of existing requests;

adding the request received from the client to the list of existing requests when the target GPP equals the current GPP; and if the target GPP is different from the current GPP:

switching from the current GPP to the target GPP after the list of existing requests are executed on the current GPP; and executing the request received from the client on the target GPP.

14. The method of claim 13 further comprising switching from the current GPP to the target GPP immediately upon receiving a GPP switch command from a virtual machine manager (VMM).

15. The method of claim 13 further comprising returning an access control violation notification to the client if the client is not permitted to access the target GPP.

16. A virtualized storage system, comprising:
   a storage device comprising a plurality of general purpose partitions (GPPs); and
   a storage controller for controlling the storage device, comprising:
      a base register interface (BRI) coupled to a virtual machine manager (VMM);
      one or more client register interfaces (CRIs) configured to be coupled to one or more clients, respectively; and
      partition switching circuitry communicatively coupled to the BRI and the one or more CRIs, the partition switching circuitry configured to:
         receive a request from a client among the one or more clients via a CRI among the one or more CRIs for accessing a target GPP among the plurality of GPPs in the storage device;
         determine whether the client is permitted for accessing the target GPP; and
         when the client is permitted for accessing the target GPP:
            determine whether the target GPP requested by the client equals a current GPP configured to be accessed by a list of existing requests;
            add the request received from the client to the list of existing requests when the target GPP equals the current GPP; and
            if the target GPP is different from the current GPP:
               switch from the current GPP to the target GPP after the list of existing requests are executed on the current GPP; and
               execute the request received from the client on the target GPP.

17. The virtualized storage system of claim 16, wherein the partition switching circuitry is configured to switch from the current GPP to the target GPP immediately upon receiving a GPP switch command from the VMM via the BRI.

18. The virtualized storage system of claim 17, wherein the partition switching circuitry comprises a protocol engine configured to switch from the current GPP to the target GPP immediately upon receiving the GPP switch command.

19. The virtualized storage system of claim 16 further comprising a partition access control table (PACT), wherein the partition switching circuitry is configured to determine whether the client is permitted for accessing the target GPP based on the PACT.

20. The virtualized storage system of claim 19, wherein the partition switching circuitry is further configured to return an access control violation notification to the client via the CRI if the partition switching circuitry determines that the client is not permitted to access the target GPP.

21. The virtualized storage system of claim 16, wherein the storage device is comprised of an embedded multimedia card (eMMC) revision 5.1 (eMMC 5.1) storage device.

22. The virtualized storage system of claim 21, wherein the request received from the client is comprised of an eMMC CMD44 command or an eMMC CMD45 command.

23. The virtualized storage system of claim 22, wherein the partition switching circuitry comprises a command queue engine (CQE) configured to:
   determine whether the target GPP requested by the client equals the current GPP among the plurality of GPPs accessed by the storage controller;
   if the target GPP equals the current GPP:
      add the eMMC CMD44 command or the eMMC CMD45 command into a first-in first-out (FIFO) command queue; and
   if the target GPP is different from the current GPP:
      add an eMMC queue barrier (QBR) command into the FIFO command queue;
      add an eMMC CMD6 command into the FIFO command queue; and
      add the eMMC CMD44 command or the eMMC CMD45 command into the FIFO command queue.

24. The virtualized storage system of claim 16, wherein the partition switching circuitry is configured to execute the request received from the client on the target GPP when the client is permitted for accessing the target GPP and the storage device is determined to be an eMMC revision 5.2 plus (eMMC 5.2+) storage device.

25. The virtualized storage system of claim 16, wherein the VMM is comprised of a Hypervisor.

* * * * *